US010731579B2

(12) United States Patent
Brier et al.

(10) Patent No.: US 10,731,579 B2
(45) Date of Patent: Aug. 4, 2020

(54) METHOD FOR REDUCING RANGE OF FLUCTUATION OF EXHAUST EMISSION VALUES OF IDENTICALLY CONSTRUCTED ENGINE ARRANGEMENTS OF A PRODUCTION SERIES

(71) Applicant: AVL LIST GMBH, Graz (AT)

(72) Inventors: Bernd Brier, Brunn am Geborge (AT); Marko Decker, Koenigsdorf (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 15/999,344

(22) PCT Filed: Feb. 17, 2017

(86) PCT No.: PCT/EP2017/053606
§ 371 (c)(1),
(2) Date: Aug. 17, 2018

(87) PCT Pub. No.: WO2017/140838
PCT Pub. Date: Aug. 24, 2017

(65) Prior Publication Data
US 2019/0107063 A1 Apr. 11, 2019

(30) Foreign Application Priority Data
Feb. 17, 2016 (AT) .................. 50102/2016

(51) Int. Cl.
F02D 41/00 (2006.01)
F02D 41/24 (2006.01)
(Continued)

(52) U.S. Cl.
CPC ..... F02D 41/0047 (2013.01); F02D 41/0007 (2013.01); F02D 41/2432 (2013.01);
(Continued)

(58) Field of Classification Search
CPC .... F02D 41/00; F02D 41/0047; F02D 41/007; F02D 41/24; F02D 41/2432; F02D 41/40; G01M 15/102
(Continued)

(56) References Cited

U.S. PATENT DOCUMENTS 3,938,377 A 2/1976 Converse, III et al.
6,425,374 B1 7/2002 Schmitz et al.
(Continued)

FOREIGN PATENT DOCUMENTS

DE 19821167 A1 11/1999
DE 19910035 A1 9/2000
(Continued)

Primary Examiner — John Kwon
Assistant Examiner — Johnny H Hoang
(74) Attorney, Agent, or Firm — Laurence A. Greenberg; Werner H. Stemer; Ralph E. Locher

(57) ABSTRACT

A method for reducing the range of fluctuation of the exhaust emission values of identically constructed engine arrangements of a production series, each having an internal combustion engine and an exhaust after treatment system. After manufacturing identically constructed engines, their engine controls are placed into a calibration operating mode and the engines are operated in calibration operating mode. At least one exhaust gas state variable is recorded along the exhaust gas flow and the measurement value is compared with a desired value or desired value range defined for the production series. If necessary, at least one setting variable of the respective engine is adjusted so that the actual value corresponds to the desired value or lies in the desired value range. Then the calibration operating mode stopped, the engine controls are put into a normal operating mode, and the internal combustion engines are operated in the normal operating mode.

19 Claims, 1 Drawing Sheet

(51) Int. Cl.
  *F02D 41/40*   (2006.01)
  *G01M 15/10*   (2006.01)
  *G01N 1/22*    (2006.01)
(52) U.S. Cl.
  CPC ........... *F02D 41/40* (2013.01); *G01M 15/102* (2013.01); *G01N 1/2252* (2013.01); *Y02T 10/144* (2013.01); *Y02T 10/44* (2013.01); *Y02T 10/47* (2013.01)
(58) Field of Classification Search
  USPC .................. 123/568.11, 568.22; 701/108
  See application file for complete search history.

(56) References Cited

U.S. PATENT DOCUMENTS

| | | |
|---|---|---|
| 9,322,741 B2 | 4/2016 | Watanabe et al. |
| 2005/0056265 A1 | 3/2005 | Center |
| 2006/0122763 A1* | 6/2006 | Wang ...................... F02D 35/02 701/103 |
| 2011/0056187 A1* | 3/2011 | Seyler ................ B01D 53/9418 60/274 |
| 2011/0113752 A1* | 5/2011 | Christner ................ F01N 9/005 60/274 |
| 2015/0020507 A1* | 1/2015 | Sun, Jr. .................. F01N 11/00 60/311 |
| 2018/0038255 A1* | 2/2018 | Garimella ........... F02D 41/0062 |
| 2018/0202373 A1* | 7/2018 | Herbst ................ F02D 41/1444 |

FOREIGN PATENT DOCUMENTS

| | | |
|---|---|---|
| DE | 102012022707 A1 | 5/2014 |
| EP | 2667169 A2 | 11/2013 |
| WO | 2013131836 A2 | 9/2013 |

\* cited by examiner

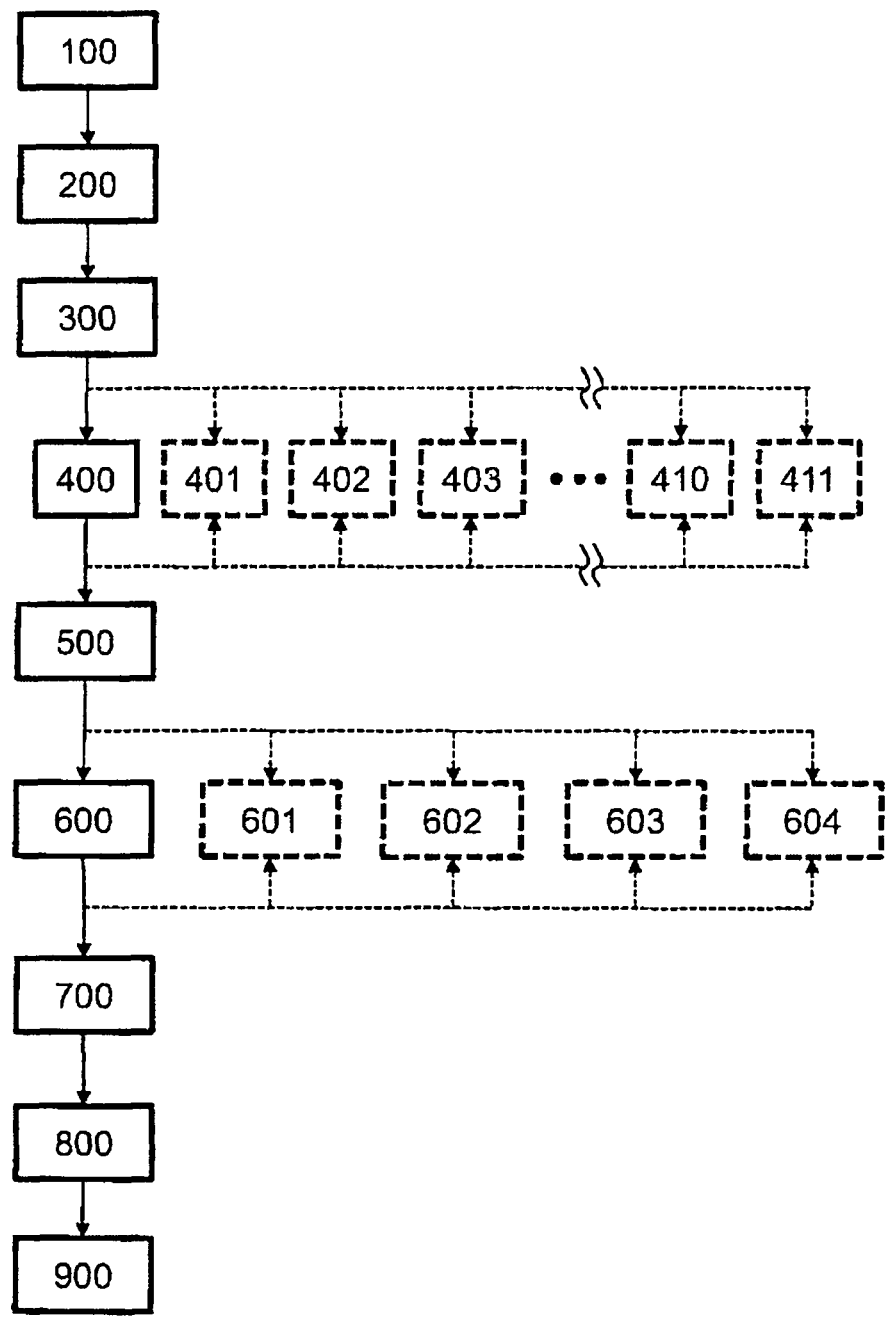

METHOD FOR REDUCING RANGE OF FLUCTUATION OF EXHAUST EMISSION VALUES OF IDENTICALLY CONSTRUCTED ENGINE ARRANGEMENTS OF A PRODUCTION SERIES

BACKGROUND OF THE INVENTION

Field of the Invention

The invention relates to a method for reducing the range of fluctuation in exhaust emission values of identically constructed engine arrangements of a production series, according to the features of the independent claim.

In order to meet the increasingly stringent exhaust regulations on internal combustion engines, engine arrangements and methods are known in the art in a which the exhaust gas of an internal combustion engine is treated in an exhaust after treatment system. A drawback of these known apparatus and methods is that, due to manufacturing tolerances, even identically constructed engine arrangements have different emission values during normal operation.

Surprisingly, it has been found that the fluctuations in the exhaust emission values are due in particular to manufacturing differences in the internal combustion engine and the optionally furnished turbocharger thereof. Thus, an exhaust after treatment system adapted to a reference engine ceases to have its optimal effect if the engine does not correspond to the reference engine, due to the manufacturing tolerances.

In the prior art, attempts have been made to improve the production accuracy in engine manufacturing, via quality assurance measures. However, the reduction in manufacturing tolerances is limited in view of manufacturing costs.

It is also known from the prior art to conduct spot-checks of the functionality and emissions of individual engine arrangements during engine production. However, these individual tests, in which for example every hundredth engine is checked, may not improve the fluctuation range of the exhaust emission values of each individual engine.

SUMMARY OF THE INVENTION

The objective of this invention is therefore to provide a method by which the fluctuation range of exhaust emission values of identically constructed engine arrangements of a production series may be reduced.

This objective of the invention is achieved in particular by the features of the independent claim.

In particular, the invention relates to a method for reducing the fluctuation range of exhaust emission values of a plurality of identically constructed engine arrangements of a production series in particular, and more particularly to a method for reducing emission variation within a production series, the engine arrangements each having an internal combustion engine and an exhaust aftertreatment system.

Optionally, the following method steps are provided:
Manufacturing a plurality of identically constructed internal combustion engines, and
Putting the engine controls of the internal combustion engines into a calibration operating mode.

For calibration, the following method steps are preferably provided:
Operating the internal combustion engines in the calibration operating mode,
Recording at least one exhaust gas state variable at a point along the exhaust gas flow that is downstream of the respective internal combustion engine and/or between the respective internal combustion engine and the associated exhaust after treatment system, and/or in particular downstream of an optionally-furnished turbocharger of the internal combustion engine,
Optionally, comparing the actual value of the respectively recorded exhaust gas state variable with a desired value or desired value range of the relevant exhaust gas state variable that has been defined for this production series,
Adjusting at least one setting variable of the respective internal combustion engine in such a way that the actual value of the recorded exhaust gas state variable corresponds to the desired value, or is in the desired value range, of the relevant exhaust gas state variable,
or maintaining the setting variable of the respective internal combustion engine if the actual value of the recorded exhaust gas state variable already corresponds to the desired value, or is already in the desired value range, of the relevant exhaust gas state variable.

Adjusting or maintaining the setting variables refers to storing these variables in the engine controls of the internal combustion engines in order for them to be applied in the normal operating mode; alternatively, this storing is done in an additional method step.

Optionally, the following method steps are also provided:
Deactivating the calibration operating mode,
Putting the engine controls of the internal combustion engines into a normal operating mode,
Operating the internal combustion engines normally in the normal operating mode.

Optionally, it is contemplated that the calibration operating mode differs from the normal operating mode.

Optionally, it is contemplated that at least one setting variable of the internal combustion engines, which is unchangeable or disabled in the normal operating mode, is changeable in the calibration operating mode.

Optionally, it is contemplated that when at least one exhaust gas state variable is being recorded, the internal combustion engines in the calibration operating mode are operated automatically or are externally-set in a specific load state, that at least one actual value of the exhaust gas state variable is recorded and compared with a desired value or desired value range of the exhaust gas state variable, defined for this production series and load state, and/or that if necessary, at least one setting variable of the respective internal combustion engine is adapted so that the recorded actual values of the exhaust gas state variable correspond to the desired value of the relevant exhaust gas state variable or are in the desired value range of the relevant exhaust gas state variable.

Optionally, it is contemplated that when the exhaust gas state variables are recorded, the internal combustion engines in the calibration operating mode are operated automatically or externally-set at a plurality of specific load points or over a certain load curve, and a plurality of actual values of the at least one exhaust gas state variable are recorded and compared with the desired values or desired value ranges of the exhaust gas state variables that have been defined for this production series and for these load points or this load curve, and that if necessary, at least one setting variable of the respective internal combustion engine is adapted so that the recorded actual values of the exhaust gas state variable correspond to the desired value, or are in the desired value range, of the relevant exhaust gas state variable.

Optionally, it is contemplated that the adapation of a setting variable of the respective internal combustion engine is done by modifying at least one parameter of the engine control or by mechanically changing or adjusting an engine part.

Optionally, it is contemplated that a change in the behavior of at least one engine actuator is effected by adjusting the at least one setting variable.

Optionally, it is contemplated that the setting variable is a correction factor and/or a correction offset in the control of the throttle position of the intake throttle or the exhaust back-pressure valve, and/or that the setting variable is a correction factor and/or a correction offset in the control of the EGR valves, and/or that the setting variable is a correction factor and/or a correction offset in the control of the position of the injection start, and/or that the setting variable is a correction factor and/or a correction offset in the control of a turbocharger, in particular the control of the wastegate valve and/or the control of a variable turbine geometry of a turbocharger.

Optionally, it is contemplated that the exhaust gas state variable(s) recorded in the calibration operating mode is/are the exhaust gas temperature, a value relating to the exhaust gas composition, the gas concentration of a specific exhaust gas constituent, the lambda value, the NOx content of the exhaust gas, the CO content of the exhaust gas, the HC content of the exhaust gas, the CO2 content of the exhaust gas, the O2 content of the exhaust gas, the NH3 content of the exhaust gas, the exhaust gas pressure and/or the exhaust gas mass flow. Optionally, it is contemplated that for recording the at least one exhaust gas state variable, engine-internal and/or external sensors are used.

Optionally, it is contemplated that the calibration operating mode is activated by an external signal, and/or that the calibration operating mode is activated and deactivated by an external signal.

Optionally, it is contemplated that the desired value of the exhaust gas state variable is determined by recording a corresponding value of a reference engine, or that the desired value range of the exhaust gas state variable is determined by recording a corresponding value range of a reference engine.

Optionally, it is contemplated that, after the initial operation of the internal combustion engine in the calibration operating mode and the subsequent normal operation of the internal combustion engine in the normal operating mode, the internal combustion engine is operated once again in the calibration operating mode in order to be calibrated and particularly in order to carry out the following steps:

Recording at least one exhaust gas state variable at a point along the exhaust gas flow downstream of the respective internal combustion engine or between the respective internal combustion engine and the associated exhaust aftertreatment system, Comparing the actual value of the respectively recorded exhaust gas state variable with a desired value or desired value range of the relevant exhaust gas state variable defined for this production series, Adjusting at least one setting variable of the respective internal combustion engine in such a way that the actual value of the recorded exhaust gas state variable corresponds to the desired value of the respective exhaust gas state variable or is in the desired value range of the relevant exhaust gas state variable, or maintaining the setting variable of the respective internal combustion engine if the actual value of the recorded exhaust gas state variable already corresponds to the desired value of the relevant exhaust gas state variable or is already in the desired value range of the relevant exhaust gas state variable, Deactivating the calibration operating mode, Putting the engine controls of the internal combustion engines into a normal operating mode, Normal operation of the internal combustion engines in the normal operating mode.

Optionally, it is contemplated that the internal combustion engine is put into the calibration operating mode directly after production and/or during the break-in phase and/or after the break-in phase, in order to be calibrated and, in particular, in order to carry out the following steps:

Recording at least one exhaust gas state variable at a location along the exhaust gas flow downstream of the respective internal combustion engine or between the respective engine and the associated exhaust aftertreatment system, Comparing the actual value of the respectively recorded exhaust gas state variable with a desired value or desired value range of the relevant exhaust gas state variable defined for this production series, Adjusting at least one setting variable of the respective internal combustion engine in such a way that the actual value of the recorded exhaust gas state variable corresponds to the desired value of the respective exhaust gas state variable or is in the desired value range of the relevant exhaust gas state variable, or maintaining the setting variable of the respective internal combustion engine if the actual value of the recorded exhaust gas state variable already corresponds to the desired value of the relevant exhaust gas state variable or is already in the desired value range of the relevant exhaust gas state variable, Deactivating the calibration operating mode, Putting the engine controls of the internal combustion engines into a normal operating mode, Normal operation of the internal combustion engines in the normal operating mode.

Optionally, it is contemplated that the method is intended for reducing the fluctuation range of the exhaust emission values in the normal use of the engine arrangements.

Optionally, it is contemplated that the method is carried out on all engine arrangements or on all internal combustion engines of the production series.

In particular, the present method is suitable and/or configured to calibrate at least one exhaust gas state variable of the internal combustion engine in a calibration operating mode in such a way that it corresponds to a desired value or desired value range that has been determined for this production series. The desired values or desired value ranges of the exhaust gas state variables are preferably determined on a reference engine, on which are used the same load conditions and in particular the same measurement locations and optionally the same measuring methods as in the calibration and as in the method according to the invention.

By calibrating the actual value of the exhaust gas state variable to a desired value or desired value range of the exhaust gas state variable, the internal combustion engines of the production series may be optimally adapted to the exhaust after treatment system, despite production-related differences. After this calibration, the calibration operating mode is deactivated and the normal operating mode is activated. The normal operating mode corresponds in particular to the operating mode that is used during normal operation of the internal combustion engine. The intended operation of the combustion engine or the engine arrangement is, for example, the normal operation of a car, truck or other apparatus driven by an internal combustion engine.

The calibration operating mode preferably differs from the normal operating mode. For example, setting variables such as parameters or maps of the engine are defined in the normal operating mode. In the calibration operating mode, in contrast, these defined setting variable may optionally be changed.

The recording of the exhaust gas state variable is preferably done at a specific load state or at a load point or a plurality of load points, or over a certain load curve. Desired values or desired value ranges of the exhaust gas state variable are preferably stored for the load states that are respectively used, so that a calibration may take place.

The calibration of the engine may for example be done directly after production. In particular, the calibration may be carried out after installing the internal combustion engine in the vehicle, and/or before installing the internal combustion engine in the vehicle. For calibration, the internal combustion engine may be or become connected to an exhaust after treatment system. This exhaust after treatment system may already be installed in the vehicle, or it may be connected to the internal combustion engine specifically for calibration outside the vehicle. Optionally, only part of the exhaust after treatment system, for example a component of the exhaust after treatment system close to the engine, is connected to the internal combustion engine for calibration. Optionally, during calibration, part or all of the exhaust after treatment system is replaced or simulated by a throttle. A muffler or silencer that is optionally furnished in the vehicle may be replaced by a throttle, for the purpose of calibrating the internal combustion engine outside the vehicle.

In currently existing engine arrangements, to allow faster heating, parts of the exhaust after treatment system are optionally located close to the engine. In such arrangements, parts of the exhaust after treatment system are usually already installed directly on the engine before the arrangement is installed in the vehicle. In particular, in this case, the calibration or measurement of the exhaust gas state variable between the engine and this part of the exhaust after treatment system may be performed directly after production and before installation in the vehicle. To adjust the exhaust back-pressure, in particular to compensate for the missing components of the exhaust after treatment system, for example additional catalytic converters or mufflers, a throttle may be arranged along the exhaust gas flow to raise the exhaust back-pressure to the level that occurs in real operation or with a fully implemented exhaust after treatment system. Alternatively, the measurement of the exhaust gas state variable and/or the calibration may be performed outside the vehicle, with a reference exhaust after treatment system. Alternatively, the measurement of the exhaust gas state variable and/or the calibration may also be carried out with the engine installed in the vehicle, with a connected exhaust after treatment system also installed in the vehicle.

If the calibration is carried out in the vehicle itself, the engine in calibration mode may be implemented, for example, when idling, on a chassis dynamometer, or while driving and, optionally, with (partially) activated brakes.

Optionally, the calibration may also be done after a break-in phase of the engine. Optionally, the calibration of the engine may be done more often, for example at a certain interval.

For calibration, at least one setting variable of the internal combustion engine is preferably adjusted in such a way that the actual value of the recorded distance [sic] state variable corresponds to the desired value or the desired value range of the relevant exhaust gas state variable. This adjustment of a setting variable is preferably carried out only if the actual value of the exhaust gas state variable does not correspond to the desired value or the desired value range. The setting variable may be, for example, a correction factor and/or a correction offset and/or the adjustment of an engine characteristic map or operating characteristic. By way of example, for example, the throttle valve position of an internal combustion engine may be changed mechanically by a certain angle, so that a correction offset is given during normal engine control or engine control in normal operation. Alternatively or additionally, the setting variable may also be adjusted done by changing a parameter of the engine control. In principle, all setting variables that are suitable for adjusting the exhaust gas state variable(s) used are also suitable for the method according to the invention.

For improved clarity, some terms are defined below. An engine control in the context of the invention is an arrangement and in particular electronics, that take over the monitoring, regulation and/or control of engine functions. A normal operating mode refers in particular to a mode of the engine control that is used in normal operation and in particular during normal operation of the engine. In particular, in this normal operating mode, some or all of the setting variables are defined. A calibration operating mode refers to a mode and in particular a mode of engine control in which the calibration according to the invention may be carried out. In this mode, preferably setting variables may be changed that are not changeable in the normal operating mode. Operation of the internal combustion engine preferably refers in all embodiments to an operation in which there is a combustion of a fuel in the combustion chamber(s) of the engine that is the same as, or at least similar to, the combustion that occurs in normal operation. The comparison between the actual value and the desired value (range) of the exhaust gas state variable(s) may take place in all embodiments, for example by calculating a difference or a quotient, in particular in a control and/or regulating unit.

In all embodiments, adjusting the at least one setting variable preferably causes a change in the behavior of at least one engine actuator. This engine actuator may be, for example, an intake throttle, an exhaust gas back-pressure valve, an EGR valve, ignition timing control, a turbocharger controller, such as a wastegate valve or a variable turbine geometry, an injection pump, a throttle, or a valve.

In the following, the invention will be further described by means of exemplary, non-limiting embodiments, which are illustrated in the attached drawing:

BRIEF DESCRIPTION OF THE DRAWING

The sole FIGURE of the drawing is a flowchart illustrating the method according to the invention.

DESCRIPTION OF THE INVENTION

According to a first embodiment, the method comprises the following steps:

100: Manufacturing a plurality of identically constructed internal combustion engines,

200:—Putting the engine controls of the internal combustion engines into a calibration operating mode.

300: Operating the internal combustion engines in the calibration operating mode,

400: Recording, and in particular measuring, the exhaust gas temperature at a point along the exhaust gas flow downstream of the internal combustion engine, preferably between the internal combustion engine and the associated exhaust after treatment system, and optionally downstream of the turbocharger of the internal combustion engine, 500: optionally, comparing the actual value of the exhaust gas temperature with a desired value range of the exhaust gas temperature that has been defined for this production series, 600: Adjusting the throttle valve position so that the actual value of the exhaust gas temperature is in the desired value range of the exhaust gas temperature, 700: Deactivating the calibration operating mode, 800:—Putting the engine control of the internal combustion engines into a normal operating mode, 900: normal operation of internal combustion engines in the normal operating mode.

The method according to the invention for calibration may take place after installation of the internal combustion engine in a vehicle and/or before installation of the internal combustion engine in a vehicle. If the method is performed outside a vehicle, after one of the above-mentioned steps 600, 700, 800 or 900, a step of installing the internal combustion engine in a vehicle may be carried out, in which the following steps are then performed in this assembly state.

According to a second embodiment of the invention, in the method of the first embodiment of the invention in step 600, instead of the throttle valve positioning, the following are adapted so that the recorded actual exhaust gas temperature is in the desired value range of the exhaust gas temperature:

601: the control of the exhaust gas recirculation valves (EGR valves),
602: the control of the injection timing,
603: the control of a variable turbocharger or the wastegate valve thereof, or for example also
604: the control of the exhaust gas back-pressure valve.

According to an additional embodiment, in a method according to the first and/or second embodiment, instead of the measurement of the exhaust gas temperature as the exhaust gas state variable in step 400, the following are used:

401: a value relating to the exhaust gas composition,
402: the gas concentration of a specific exhaust gas component,
403: the lambda value,
404: the NOx content of the exhaust gas,
405: the CO content of the exhaust gas,
406: the HC content of the exhaust gas,
407: the CO2 content of the exhaust gas,
408: the O2 content of the exhaust gas,
409: the NH3 content of the exhaust gas,
410: the exhaust gas pressure and/or
411: the exhaust gas mass flow.

According to a preferred embodiment, the internal combustion engines and the engine controls thereof are put into a calibration mode for calibration. Subsequently, the internal combustion engines are operated in the calibration mode.

When operating the internal combustion engines in the calibration mode, the exhaust gas temperature is recorded at a point along the exhaust gas flow downstream of the respective internal combustion engine, in particular between the respective internal combustion engine and a connected exhaust after treatment system, and the exhaust after treatment system or a part thereof is optionally replaced by a throttle.

In calibration mode, operating points are approached in a steady state, with the throttle valve position set according to the factory default. The exhaust gas temperature is then measured or recorded. The throttle valve position may be adapted according to the deviation of the actual value of the exhaust gas temperature from the desired value or desired value range of the exhaust gas temperature for this load point. A continuous adjustment with simultaneous temperature measurement is possible, or according to an alternative embodiment, a targeted adjustment due to previously known relationships between temperature and throttle valve position. The resulting offset or correction factor, in particular the straight line by which the throttle valve is adjusted or adapted, may then be stored in the engine control in order affect normal operation. As a result, at least one setting variable of the respective internal combustion engine is adapted in such a way that the actual value of the recorded exhaust gas state variable corresponds to the desired value of the respective exhaust gas state variable or is in the desired value range of the relevant exhaust gas state variable, To increase the exhaust gas temperature, for example, the throttle valve may be further closed to a certain extent. This change may be set as a constant offset over the entire range of throttle valve characteristics. Optionally, this offset may also be dependent on the throttle valve position itself and in particular it may vary over the course of the throttle valve position. In order to reduce the exhaust gas temperature, the throttle valve position may be further opened by a certain amount in the same way. These adaptations thus change a setting variable of the respective internal combustion engine for a certain load or for a certain load curve.

If the actual value of the recorded exhaust gas state variable in the measurement already corresponds to the desired value of the relevant exhaust gas state variable, or is in the desired value range of the respective exhaust gas state variable, the adaptation of a setting variable may optionally be omitted.

The invention claimed is:

1. A method for reducing a range of fluctuation of exhaust emission values of a plurality of identically constructed engine configurations of a production series, wherein each of the respective engine configurations has an internal combustion engine and an exhaust after treatment system, the method comprising the following steps:

manufacturing a plurality of identically constructed internal combustion engines;

placing respective engine controls of the internal combustion engines into a calibration operating mode;

operating the internal combustion engines in the calibration operating mode;

recording at least one exhaust gas state variable at a point along an exhaust gas flow;

comparing an actual value of the respectively recorded exhaust gas state variable with a desired value or desired value range of a relevant exhaust gas state variable defined for the production series;

setting at least one setting variable of the respective internal combustion engine such that the actual value of the recorded exhaust gas state variable either equals the desired value, or lies within the desired value range, of the relevant exhaust gas state variable;

wherein, when the actual value of the recorded exhaust gas state variable does not equal the desired value of the relevant exhaust gas state variable or does not lie within the desired value range of the relevant exhaust gas state variable, the setting step includes adjusting the at least one setting variable of the respective internal combustion engine such that the actual value of the recorded exhaust gas state variable either equals the desired value, or lies within the desired value range, of the relevant exhaust gas state variable;

wherein, when the actual value of the recorded exhaust gas state variable already equals the desired value of the relevant exhaust gas state variable or lies within the desired value range of the relevant exhaust gas state variable, the setting step includes maintaining the at least one setting variable of the respective internal combustion engine;

deactivating the calibration operating mode;

placing the engine controls of the internal combustion engines into a normal operating mode; and enabling the internal combustion engines to operate normally, in a normal operating mode.

2. The method according to claim 1, wherein the internal combustion engine has a turbocharger and the recording step comprises recording the exhaust gas state variable at a point after the turbocharger of the internal combustion engine in a direction of the exhaust gas flow.

3. The method according to claim 1, wherein the calibration operating mode differs from the normal operating mode.

4. The method according to claim 1, wherein at least one setting variable of the internal combustion engine is changeable in the calibration operating mode, and the at least one setting variable of the internal combustion engine is selected from the group consisting of a variable that is unchangeable in the normal operating mode, and a variable that is disabled in the normal operating mode.

5. The method according to claim 1, which comprises:

operating the internal combustion engines in a specific load state when an exhaust gas state variable is recorded in the calibration operating mode;

recording at least one actual value of the exhaust gas state variable and compared the at least one actual value with a desired value or desired value range that has been defined for the production series and load state for the exhaust gas state variable; and if necessary, adjusting at least one setting variable of the respective internal combustion engine so that the recorded actual values of the exhaust gas state variable equal the desired value, or lie in the desired value range, of the relevant exhaust gas state variable.

6. The method according to claim 1, which comprises:

when the exhaust gas state variables are recorded, operating the internal combustion engines in the calibration operating mode automatically or externally-set at a plurality of specific load points or over a certain load curve;

recording a plurality of actual values of the exhaust gas state variable and comparing the actual values with desired values or desired value ranges of the exhaust gas state variable defined for the production series and load points or load curve; and if necessary, adapting at least one setting variable of the respective internal combustion engine so that the recorded actual values of the exhaust gas state variables equal the desired values, or lie in the desired value ranges, of the relevant exhaust gas state variable.

7. The method according to claim 6, wherein the step of adapting a setting variable of the respective internal combustion engine comprises performing a step selected from the group consisting of: modifying at least one parameter of the engine control, mechanically changing an engine component, and adjusting an engine component.

8. The method according to claim 6, which comprises changing a behavior of at least one engine actuator by adjusting the at least one setting variable.

9. The method according to claim 6, wherein the setting variable comprises at least one variable selected from the group consisting of:

a correction factor in the control of the valve position of the intake throttle or the exhaust gas back-pressure valve, a correction offset in the control of the valve position of the intake throttle or the exhaust gas back-pressure valve, a correction factor in the control of the EGR valves, a correction offset in the control of the EGR valves, a correction factor in the control of the position of the start of injection, a correction offset in the control of the position of the start of injection, a correction factor in the control of a turbocharger, a correction offset in the control of a turbocharger, a correction factor in the control of the wastegate valve, a correction offset in the control of the wastegate valve, a correction factor in the control of a variable turbine geometry of a turbocharger, and a correction offset in the control of a variable turbine geometry of a turbocharger.

10. The method according to claim 1, wherein the at least one exhaust gas state variable recorded in the calibration operating mode is a variable selected from the group consisting of an exhaust gas temperature, a value relating to an exhaust gas composition, a gas concentration of a specific exhaust gas constituent, a lambda value, a NOx content of the exhaust gas, a CO content of the exhaust gas, an HC content of the exhaust gas, a $CO_2$ content of the exhaust gas, an $O_2$ content of the exhaust gas, an $NH_3$ content of the exhaust gas, an exhaust gas pressure and an exhaust gas mass flow.

11. The method according to claim 1, which comprises using sensors for recording the at least one exhaust gas state variable.

12. The method according to claim 1, which comprises:

activating the calibration operating mode by way of an external signal; or activating and deactivating the calibration operating mode by way of an external signal.

13. The method according to claim 1, which comprises determining the desired value of the exhaust gas state variable by recording a corresponding value from a reference engine, or determining the desired value range of the exhaust gas state variable by recording a corresponding value range of a reference engine.

14. The method according to claim 1, which comprises, after a first operation of the internal combustion engine in the calibration operating mode and a subsequent normal operation of the internal combustion engine in the normal operating mode, once more operating the internal combustion engine in calibration operating mode in order to perform the following steps:

recording at least one exhaust gas state variable at a point along the exhaust gas flow;

comparing the actual value of the respectively recorded exhaust gas state variable with a desired value or a desired value range of the relevant exhaust gas state variable defined for the production series;

setting at least one setting variable of the respective internal combustion engine such that the actual value of the recorded exhaust gas state variable either equals the desired value, or lies within the desired value range, of the relevant exhaust gas state variable;

wherein, when the actual value of the recorded exhaust gas state variable does not equal the desired value of the relevant exhaust gas state variable or does not lie within the desired value range of the relevant exhaust gas state variable, the setting step includes adjusting the at least one setting variable of the respective internal combustion engine in such a way that the actual value of the recorded exhaust gas state variable equals the desired value, or lies in the desired value range, of the relevant exhaust gas state variable;

wherein, when the actual value of the recorded exhaust gas state variable already equals the desired value of the relevant exhaust gas state variable or lies within the desired value range of the relevant exhaust gas state variable, the setting step includes maintaining the setting variable of the respective internal combustion engine;

deactivating the calibration operating mode;

placing the engine controls of the internal combustion engines into a normal operating mode; and operating the internal combustion engines normally in the normal operating mode.

15. The method according to claim 1, which comprises placing the internal combustion engine into the calibration operating mode during at least one point in time selected from the group consisting of directly after production, during a break-in phase, and after the break-in phase, in order to perform the following steps:

recording at least one exhaust gas state variable at a location along the exhaust gas flow;

comparing the actual value of the respectively recorded exhaust gas state variable with a desired value or desired value range of the relevant exhaust gas state variable defined for the production series;

setting at least one setting variable of the respective internal combustion engine such that the actual value of the recorded exhaust gas state variable either equals the desired value, or lies within the desired value range, of the relevant exhaust gas state variable;

wherein, when the actual value of the recorded exhaust gas state variable does not equal the desired value of the relevant exhaust gas state variable or does not lie within the desired value range of the relevant exhaust gas state variable, the setting step includes adjusting the at least one setting variable of the respective internal combustion engine in such a way that the actual value of the recorded exhaust gas state variable equals the desired value, or lies in the desired value range, of the relevant exhaust gas state variable;

wherein, when the actual value of the recorded exhaust gas state variable already equals the desired value of the relevant exhaust gas state variable or lies within the desired value range of the relevant exhaust gas state variable, the setting step includes maintaining the setting variable of the respective internal combustion engine;

deactivating the calibration operating mode;

placing the engine controls of the internal combustion engines into a normal operating mode; and operating the internal combustion engines normally in the normal operating mode.

16. The method according to claim 1, configured to reduce the range of fluctuation of the exhaust emission values in the normal use of the engine configurations.

17. The method according to claim 1, which comprises carrying out the method on all engine configurations or on all internal combustion engines of the production series.

18. The method according to claim 1, wherein the at least one exhaust gas state variable is recorded downstream of the respective internal combustion engine.

19. The method according to claim 1, wherein the at least one exhaust gas state variable is recorded between the respective internal combustion engine and an associated exhaust after treatment system.

* * * * *